(12) United States Patent
Lee et al.

(10) Patent No.: US 8,965,633 B2
(45) Date of Patent: Feb. 24, 2015

(54) SYSTEM AND METHOD FOR SPEED ADAPTIVE STEERING OVERRIDE DETECTION DURING AUTOMATED LANE CENTERING

(75) Inventors: Jin-Woo Lee, Rochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/224,772

(22) Filed: Sep. 2, 2011

(65) Prior Publication Data

US 2013/0060413 A1 Mar. 7, 2013

(51) Int. Cl.
| | | |
|---|---|---|
| A01B 69/00 | (2006.01) | |
| B62D 6/00 | (2006.01) | |
| B62D 1/28 | (2006.01) | |
| B62D 6/02 | (2006.01) | |
| B62D 15/02 | (2006.01) | |

(Continued)

(52) U.S. Cl.
CPC *B62D 1/286* (2013.01); *B62D 6/00* (2013.01); *B62D 6/02* (2013.01); *B62D 15/025* (2013.01); *B60W 50/10* (2013.01); *B60W 30/12* (2013.01)
USPC ............ 701/41; 701/42; 701/43; 701/44

(58) Field of Classification Search
CPC ........................................... B62D 6/00
USPC ................... 701/23, 41, 42, 43, 44
See application file for complete search history.

(56) References Cited

U.S. PATENT DOCUMENTS

| | | | | |
|---|---|---|---|---|
| 5,355,717 | A | * | 10/1994 | Tanaka et al. ................. 73/105 |
| 5,765,116 | A | * | 6/1998 | Wilson-Jones et al. ......... 701/41 |
| 6,185,492 | B1 | * | 2/2001 | Kagawa et al. ................ 701/41 |

(Continued)

FOREIGN PATENT DOCUMENTS

| | | |
|---|---|---|
| DE | 10 2004 057 262 A1 | 6/2006 |
| DE | 10 2005 057 251 A1 | 6/2007 |

(Continued)

OTHER PUBLICATIONS

U.S. Appl. No. 13/101,271, filed May 5, 2011, Lee et al.

(Continued)

*Primary Examiner* — Calvin Cheung
*Assistant Examiner* — Basil T Jos
(74) *Attorney, Agent, or Firm* — Mark S. Cohen; Pearl Cohen Zedek Latzer Baratz LLP

(57) ABSTRACT

One or more vehicle steering measurements of a vehicle may be measured. One or more expected vehicle steering measurements may be calculated, each calculated expected vehicle steering measurement corresponding to one of the measured vehicle steering measurements. At least one difference between one of the measured vehicle steering measurements and its corresponding calculated expected vehicle steering measurement may be calculated. A speed of the vehicle may be measured. One or more current threshold values may be calculated based on the measured speed, each of the current threshold values corresponding to one of the measured vehicle steering measurements and its corresponding calculated expected vehicle steering measurement. An automatic vehicle control system may be deactivated when one or more of the calculated differences exceeds its corresponding current threshold value.

12 Claims, 8 Drawing Sheets

(51) Int. Cl.
*B60W 50/10* (2012.01)
*B60W 30/12* (2006.01)

(56) References Cited

U.S. PATENT DOCUMENTS

| | | | |
|---|---|---|---|
| 6,665,603 B2* | 12/2003 | Jindo et al. | 701/96 |
| 7,177,760 B2* | 2/2007 | Kudo | 701/25 |
| 7,613,556 B2* | 11/2009 | Arima et al. | 701/41 |
| 2001/0016798 A1* | 8/2001 | Kodaka et al. | 701/301 |
| 2002/0169531 A1* | 11/2002 | Kawazoe et al. | 701/41 |
| 2004/0230375 A1* | 11/2004 | Matsumoto et al. | 701/301 |
| 2005/0043867 A1* | 2/2005 | Kudo | 701/23 |
| 2010/0131233 A1 | 5/2010 | Deng et al. | |
| 2011/0036660 A1* | 2/2011 | Kojo et al. | 180/446 |
| 2013/0103264 A1* | 4/2013 | Takashima et al. | 701/42 |

FOREIGN PATENT DOCUMENTS

| | | |
|---|---|---|
| DE | 10 2007 022 184 | 11/2008 |
| DE | 10 2010 030 164 A1 | 12/2011 |
| JP | 2002019634 A * | 1/2002 |

OTHER PUBLICATIONS

U.S. Appl. No. 13/224,803, filed Sep. 2, 2011, Lee et al.
DE Office Action Application No. 102012215305.5 Dated Aug. 19, 2014.

* cited by examiner

SYSTEM AND METHOD FOR SPEED ADAPTIVE STEERING OVERRIDE DETECTION DURING AUTOMATED LANE CENTERING

FIELD OF THE INVENTION

The present invention is related to methods and systems to determine an override event for an automated steering system or method using, for example, a combination of steering angle, steering torque, vehicle speed, and other data.

BACKGROUND

Many vehicles are equipped with autonomous and/or semi-autonomous driving systems, applications, and/or features. Autonomous and semi-autonomous driving systems may provide automated driving controls that reduce the driver action required for operating the vehicle. Automated lane centering methods, features, and applications, for example, may be activated by the driver while the vehicle is in motion and may maintain the vehicle position in the center of a lane. Adaptive lane centering systems, may maintain a constant lane offset, or vehicle position relative to a lane on the road the vehicle is driving upon. Adaptive lane centering systems may reduce driver fatigue and increase safety by maintaining the vehicle position with respect to the road with reduced driver input.

Safety considerations may be taken into account when designing a vehicle lane centering system or other autonomous driving systems. In order to conform to safety requirements, an adaptive lane centering application may be overridden by the driver at any time. When the driver overrides the vehicle lane centering system, the system relinquishes full steering control of the vehicle to the driver. Many autonomous or semi-autonomous steering control override detection systems and methods, however, may not be reliable and may not accurately detect a vehicle steering override condition. Many vehicle automated steering systems may be less reliable at high and low speeds. For example, at low speed a steering wheel requires higher levels of torque to maneuver, and an autonomous steering feature may falsely interpret a slight steering wheel movement to be a steering override event. At high speed, a vehicle steering system may, for example, be too sensitive and have a high steering override threshold. As a result, a driver may over-steer in order to gain control of the vehicle, and the vehicle steering system override detection system may lag behind the steering wheel input causing a sudden movement or jerk in the steering wheel.

SUMMARY

In accordance with an embodiment of the invention, one or more vehicle steering measurements of a vehicle may be measured. One or more expected vehicle steering measurements may be calculated, each calculated expected vehicle steering measurement corresponding to one of the measured vehicle steering measurements. At least one difference between at least one of the measured vehicle steering measurements and its corresponding calculated expected vehicle steering measurement may be calculated. A speed of the vehicle may be measured. One or more current threshold values may be calculated based on the measured speed, each of the current threshold values corresponding to one of the measured vehicle steering measurements and its corresponding calculated expected vehicle steering measurement. An automatic vehicle control system may be deactivated when one or more of the calculated differences exceeds its corresponding current threshold value. The vehicle steering measurements may include a vehicle steering angle measurement, vehicle steering torque measurement, or other vehicle dynamics measurements. The automatic vehicle control system may include an automated lane centering system, lane changing system, lane keeping assist, or other autonomous vehicle steering control system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
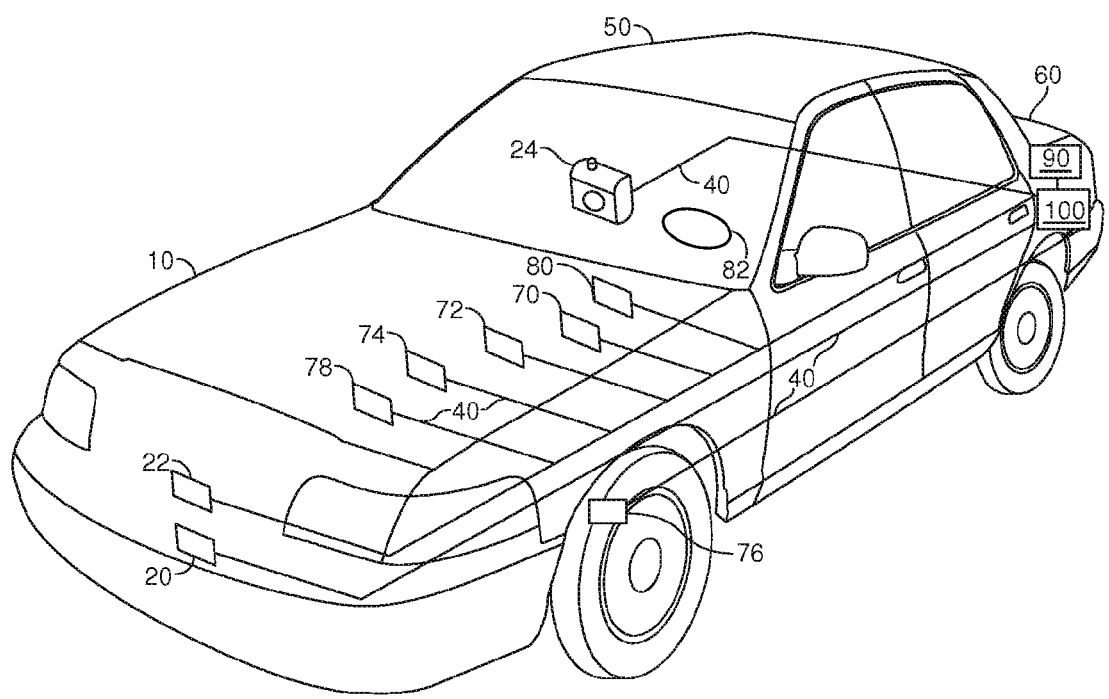
FIG. 1 is a schematic diagram of a vehicle with a vehicle automated steering override detection system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, throughout the specification discussions utilizing terms such as "processing," "computing," "storing," "calculating," "determining," "evaluating," "measuring," "providing," "transferring," "outputting," "inputting," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Autonomous, semi-autonomous, automated or automatic steering control features (e.g., automated lane centering, adaptive lane centering, etc.) may maintain or control the position of a vehicle with respect to the road with reduced driver input (e.g., steering wheel movement). In order to comply with safety requirements, however, the driver may need to regain full control of the vehicle steering controls and deactivate or disengage the steering control system. The driver may regain control of the vehicle, for example, when another vehicle swerves into the driver's lane, an obstacle lies in front of the vehicle, the vehicle comes into close proximity with a guardrail, the driver switches lanes, or in other circumstances. When driver encounters a circumstance requiring the driver to regain control of the steering quickly, an automated vehicle steering system override may have to be performed quickly and easily. An automated vehicle steering override detection system may, therefore, be required to function with high precision at low speeds, high speeds, on curved roads, on banked roads and in other driving scenarios. At lower speeds application of more torque to the wheels may be required for steering the vehicle than at higher speeds; therefore, the minimum torque required to override the system may be higher at low speeds than high speeds. Conversely, at higher speeds, application of less torque may be required for steering the vehicle than at lower speeds; therefore, the minimum torque required to override the automated steering control system may be lower at high speeds to ensure the driver may easily regain control of the vehicle if needed. When a vehicle turns while driving on a curved road or banked road, more or less steering torque may be required to steer the vehicle, depending on the direction of the turn, than would be required on a straight or horizontal road. According to embodiments of the present invention, an automated vehicle steering control override system may adapt to different driving scenarios or conditions. An automated vehicle steering control override system may adapt to driving scenarios by calculating expected steering torque and steering angle values based on measured, calculated and/or pre-determined vehicle steering measurements.

In one embodiment of the present invention, a vehicle may be equipped with an adaptive or automatic lane centering feature or application. An adaptive lane centering feature may maintain a constant lane offset or vehicle position relative to a lane on the road the vehicle is driving upon. A computer vision sensor (e.g., a camera), light detection and ranging (LIDAR) sensor, or other type of sensor may measure data allowing an adaptive lane centering feature to determine the lane offset or relative location of the vehicle with respect road features, for example, lane markers(s), road shoulder(s), median barrier(s), edge of the road and other objects or features. The relative location of the vehicle with respect to road features may be determined based on, for example, the global positioning system (GPS) location data and the map database of the vehicle, a forward facing camera measured relative distance to road features, and/or other information. The adaptive lane centering feature may control the vehicle steering based on the determined relative position of the vehicle in order to maintain constant or relatively constant (e.g., with a resolution of 10 cm) vehicle lane offset or position within a lane. The adaptive lane centering feature, in some embodiments, may control the direction of vehicle travel by controlling the steering angle and/or steering torque of the vehicle by outputting a steering angle control command to an electrical power steering (EPS), active front steering (AFS), active rear steering (ARS), or other system. The adaptive lane centering feature may, in some embodiments, control the steering angle directly or with or without an EPS, AFS, ARS, or other system.

In one embodiment of the present invention, a vehicle may be equipped with an automated lane keeping assist application or feature. A lane keeping assist application may automatically control the vehicle steering to ensure that the vehicle stays within a pre-determined lane or path on the road. A lane keeping assist application may, in some embodiments, not control the vehicle steering unless the vehicle begins to move out of a lane, at which point the lane keeping assist system may automatically control the steering to maintain the vehicle within the lane. A lane keeping assist feature may function by determining the relative position of the vehicle with respect to road features (e.g., lane marker(s), road shoulder(s), median barrier(s), or other road features) and adjusting the steering control to maintain the vehicle within a lane. The relative position of the vehicle with respect to road features may be determined based on the GPS location data of the vehicle, vehicle measured relative distance to road features, or other information. The lane keeping assist feature may control the vehicle steering based on the determined relative position of the vehicle in order to maintain the vehicle within a lane. The lane keeping assist feature may control the direction of vehicle travel by controlling the steering angle and/or steering torque of the vehicle by outputting a steering angle and/or steering torque control command to an EPS, an AFS, an ARS, or other system. The lane keeping assist feature may, in some embodiments, control the steering angle directly or with or without an EPS, AFS, ARS, or other system.

According to embodiments of the present invention, an automated steering control override system may measure, estimate, or evaluate, using sensor(s) associated with the vehicle, vehicle steering measurements or vehicle steering conditions such as the steering angle and steering torque of a vehicle. Vehicle steering measurements or vehicle steering conditions may be measured, estimated, or evaluated at pre-determined intervals (e.g., every 10 milliseconds) while the vehicle is in motion. In some embodiments, automated steering control override detection system may measure steering angle conditions and steering torque conditions of a vehicle continuously while the vehicle is in motion. Other vehicle dynamics information, for example, speed, acceleration, heading, yaw-rate, lane offset, driver input, and other factors may also be measured.

According to embodiments of the present invention, a vehicle automated steering override detection system may determine, based on the measured vehicle steering measurements steering torque, steering angle), and/or other information speed, acceleration, heading, yaw-rate, other driver input, etc.) of a vehicle, whether to override, de-activate, or disengage an automated vehicle steering control system. Embodiments of the present invention may, for example, be employed while a vehicle automated steering system is engaged, activated or functioning. The vehicle automated steering override detection system may measure the steering angle, steering torque, acceleration, lateral acceleration, longitudinal acceleration, speed, yaw-rate and/or other vehicle dynamics or steering measurements while the vehicle automated steering control system is activated.

According to embodiments of the present invention, an automatic vehicle control system may be activated and may output a steering angle command to an automated steering override detection system. An automated steering override detection system may be based on, for example, the steering angle command calculate an expected steering angle and/or expected steering torque. The automated steering override detection system may compare the expected steering angle and/or expected steering torque to a sensor-measured, e.g., actual steering angle and/or sensor-measured steering torque. If the absolute value of the difference between measured steering torque and the expected steering torque is greater than a torque threshold value, then an automated steering control system may be disengaged. If the absolute value of the difference between measured steering angle and the expected steering angle is greater than a current threshold steering angle value, then an automated steering control system may be disengaged. The current threshold steering angle value may vary as a function of current vehicle speed. Thus, the current threshold steering angle value that is applied to determine disengagement of the automated steering control system may decrease as the current vehicle speed is increased. Conversely, the current threshold steering angle value may increase as the current vehicle speed is decreased. The variation or adjustment of the current threshold steering angle value as a function of vehicle speed may be limited to conditions when the current vehicle speed lies within a predetermined range of speeds. For example, when the current vehicle speed is greater than the predetermined range of speeds, the current threshold steering angle value may be assigned a constant predetermined minimum value. Similarly, when the current vehicle speed is less than the predetermined range of speeds, the current threshold steering angle value may be assigned a constant predetermined maximum value. Such ranges need not be used, or a range may cover all speeds of which the vehicle is capable of achieving.

In one embodiment of the present invention, an automated steering override detection system may disengage an automated steering control system if the absolute value of the difference between measured steering angle and the expected steering angle is greater than the current threshold steering angle value, and/or the absolute value of the difference between measured torque and the expected steering torque is greater than a current torque threshold value. In addition to the functional dependence on current vehicle speed, the current threshold steering angle and current torque threshold values may also depend on, or vary based on, road condition(s), curvature of the road, steering system dynamics, vehicle acceleration, type of vehicle, and/or other factors. Other or different vehicle steering or vehicle dynamics measurements may factor into the decision to override. The terms measurement, parameter, condition, value, and other terms may, in some embodiments, be used interchangeably and have equivalent meaning.

FIG. 1 is a schematic diagram of a vehicle with a vehicle automated steering override detection system according to an embodiment of the present invention. A vehicle 10 (e.g., a car, truck, or another vehicle) may include a vehicle automated steering override detection system 100. Vehicle automated steering override detection system 100 may operate in conjunction with or separate from one or more automatic vehicle control systems, autonomous driving applications or vehicle automated steering systems 90. Vehicle automated steering system 90 may, for example, be an adaptive lane centering, low speed lane centering, lane keeping assist, or other applications. One or more vehicle automated steering system(s) 90 may be component(s) of system 100, or vehicle automated steering system(s) 90 may be separate from system 100. Vehicle automated steering system 90 may, when engaged, fully or partially control the steering of the vehicle and reduce driver (e.g., operator of the vehicle) steering control input via the steering wheel 82 and/or steering system, which may include an electrical power steering (EPS) system and/or other components.

One or more sensor(s) may be attached to or associated with the vehicle 10. A computer vision sensor (e.g., a camera) 24, LIDAR, or laser radar (LADAR), sensor 20, radar sensor 22, an imager, or another remote sensing device may obtain data allowing system 100 to determine the relative location of the vehicle with respect road features, for example, lane markers(s), road shoulder(s), median barrier(s), edge(s) of the road and other objects or features. Camera 24 may, for example, measure lane offset, heading angle, lane curvature and/or other information (e.g., speed, acceleration, yaw-rate, other driver input etc.) and provide the information to system 90. Vehicle automated steering control system 90 may maintain or control the position of a vehicle with respect to the road based on the sensor measured relative location of the vehicle with respect to road features.

In one embodiment of the present invention, vehicle 10 may include one or more devices or sensors to measure vehicle steering measurements, vehicle steering conditions, vehicle steering parameters, vehicle dynamics, driver input, or other vehicle related conditions or measurements. The vehicle dynamics measurement device(s) may include one or more steering angle sensor(s) 70 (e.g., connected to steering wheel 82 and/or another component of the steering system) and/or steering torque sensor(s) 80 (e.g., a torsion bar, torsion sensor, torquemeter, torque transducer, or other device). Steering torque sensor(s) 80 may be connected to or associated with steering wheel 82, a steering column, steering rack and pinion, a vehicle axle, and/or another component of the steering system. The vehicle dynamics measurement device(s) may also include one or more accelerometer(s) 72, speedometer(s) 74, wheel speed sensor(s) 76, inertial measurement unit(s) (IMU) 78, or other devices. The vehicle dynamics measurement device(s) may measure vehicle dynamics conditions or driver input including steering angle steering torque steering direction lateral (e.g., angular or centripetal) acceleration, longitudinal acceleration, yaw-rate, lateral and longitudinal velocity, speed, wheel rotation, and other vehicle dynamics characteristics of vehicle 10. The measured vehicle dynamics, vehicle conditions, steering measurements, steering conditions, or driver input information may be transferred to system 100 via, for example, a wire link (e.g., a controller area network bus CAN bus, Flexray, Ethernet) 40 or a wireless link. The measured vehicle dynamics, vehicle conditions, steering measurements, steering conditions, or driver input information data may be used by system 100 or another system to calculate steering angle, steering torque, dead reckoning based vehicle position, and other calculations.

In one embodiment of the present invention, vehicle automated steering override detection system 100 is or includes a computing device mounted on the dashboard of the vehicle, in passenger compartment 50 or in trunk 60. In alternate embodiments, vehicle automated steering override detection system 100 may be located in another part of the vehicle, may be located in multiple parts of the vehicle, or may have all or part of its functionality remotely located (e.g., in a remote server or in a portable computing device such as a cellular telephone).

While various sensors and inputs are discussed, in certain embodiments only a subset (e.g. one) type of sensor or input may be used.

Figure 2:
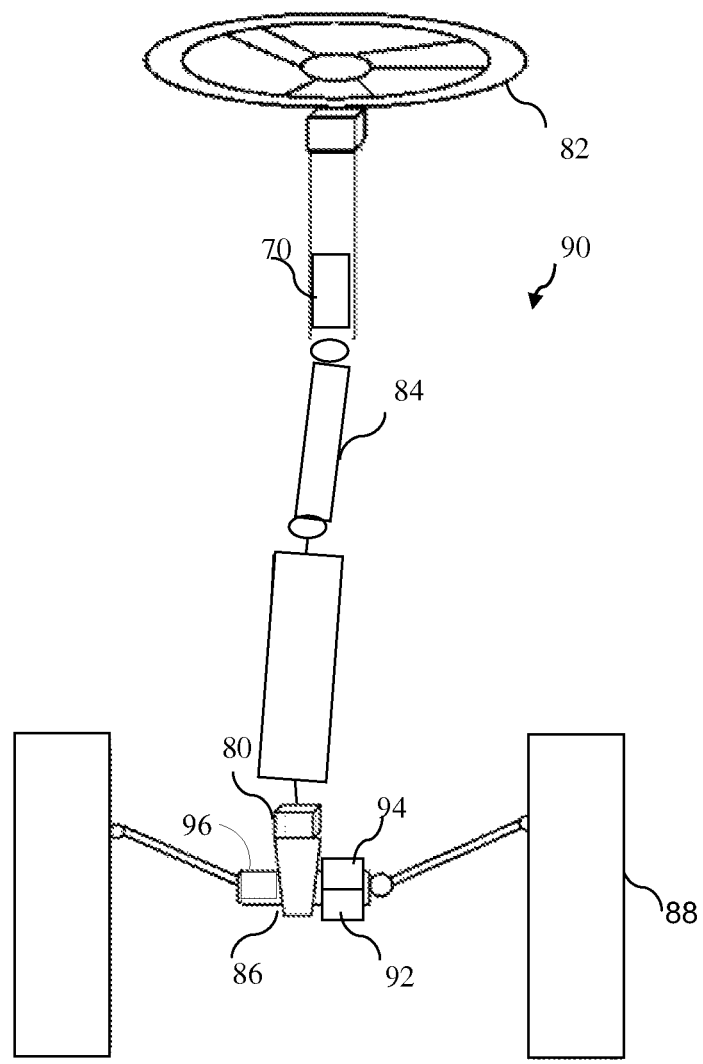
FIG. 2 is a schematic depiction of a vehicle automated steering system according to an embodiment of the present invention.

FIG. 2 is a schematic depiction of a vehicle automated steering system according to an embodiment of the present invention. Vehicle automated steering system 90 may be installed in a vehicle (e.g., a car, an automobile, truck, or another vehicle). System 90 may include a steering wheel 82 connected to a steering column 84. The steering column 84 may be connected to a rack and pinion 84, which converts or transforms the rotary motion of the steering wheel 82 and steering column 84 into linear motion or displacement of the vehicle tires or wheels 88. A steering angle sensor 70 may be mounted to the steering wheel 82, steering column 84, an EPS system 92, an AFS system 94, an ARS system 96, or be otherwise associated with the automated steering control system 90. A steering torque sensor 80 (e.g., steering torsion bar, torsion sensor, torquemeter, torque transducer, or other device) may also be mounted to the steering column 84, steering wheel 82, rack and pinion 84, wheel axle or be otherwise associate with the automated steering control system 90. Steering torque sensor 80 and steering angle sensor 70 may, in some embodiments, be associated with or mounted on EPS 92, AFS 94, ARS 96, or other systems.

Figure 3:
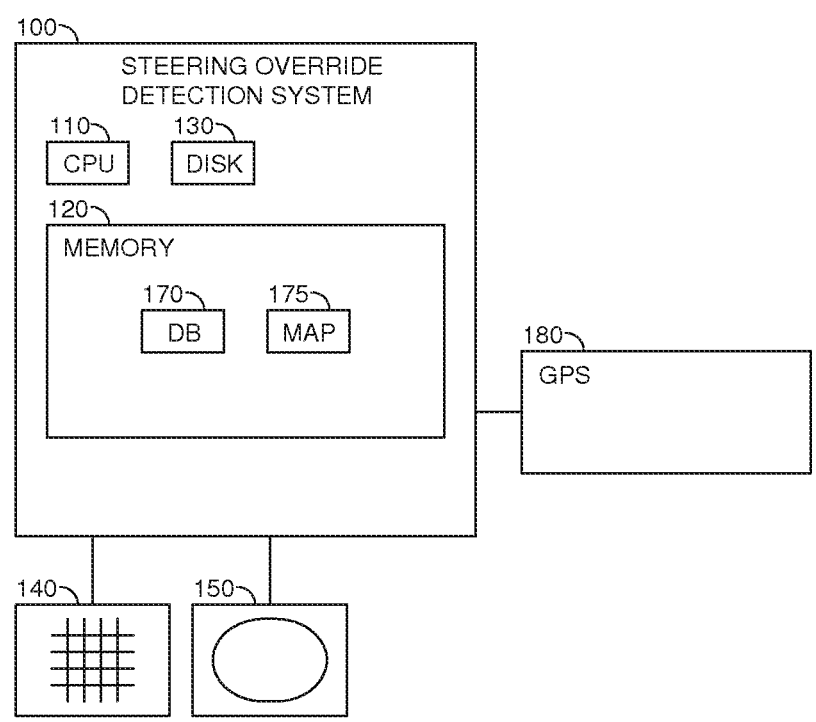
FIG. 3 is a schematic diagram of a vehicle automated steering override detection system according to an embodiment of the present invention.

FIG. 3 is a schematic diagram of a vehicle automated steering override detection system according to an embodiment of the present invention. Autonomous or automated steering override detection system 100 may include one or more processor(s) or controller(s) 110, memory 120, long term storage 130, input device(s) or area(s) 140, and output device(s) or area(s) 150. Input device(s) or area(s) 140 may include, for example, a touch screen, a keyboard, microphone, pointer device, or other device. Output device(s) or area(s) 150 may include, for example, a display, screen, audio device such as speaker or headphones, or other device. Input device(s) or area(s) 140 and output device(s) or area(s) 150 may be combined into, for example, a touch screen display and input which may be part of system 100.

System 100 may include one or more databases 170, which may include, for example, speed ranges, steering angle thresholds, steering torque thresholds, steering inertia information, steering damping information, steering stiffness information, and other information or data. Databases 170 may be stored all or partly in one or both of memory 120, long term storage 130, or another device.

Processor or controller 110 may include, for example, a central processing unit (CPU), a chip or any suitable computing or computational device. Processor or controller 110 may include multiple processors, and may include general-purpose processors and/or dedicated processors such as graphics processing chips. Processor 110 may be configured to execute code or instructions that are stored, for example, in memory 120 or long-term storage 130, so as to carry out embodiments of the present invention.

Memory 120 may be or may include, for example, a Random Access Memory (RAM), a read only memory (ROM), a Dynamic RAM (DRAM), a synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 4:
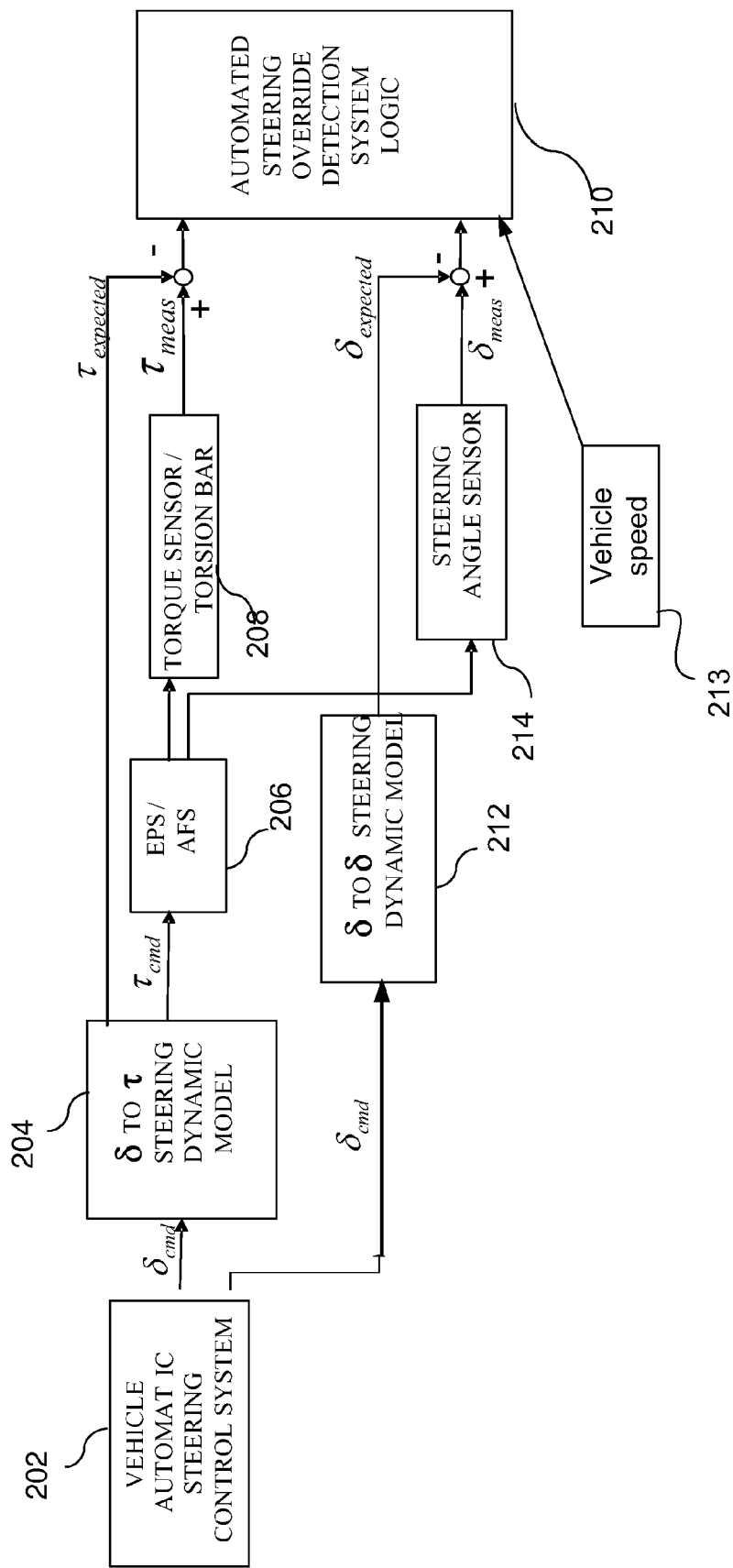
FIG. 4 is a block diagram of a steering override detection system, process, and/or algorithm according to an embodiment of the present invention.

FIG. 4 is a block diagram of a steering override detection system, process, and/or algorithm according to an embodiment of the present invention. As depicted in block 202, a steering angle command, $\delta_{cmd}$, may be output by a vehicle automated steering system 90 (e.g., adaptive lane centering, automated lane centering, or other system). As depicted in block 204, a steering torque command, $\tau_{cmd}$ may be calculated based on the steering angle command, $\delta_{cmd}$, from the vehicle automated steering control system 90.

Steering angle command, $\delta_{cmd}$, may, in some embodiments, be the steering angle change that the vehicle automated control system outputs to a vehicle steering system, motor associated with the vehicle steering system, or other component of vehicle steering system in order to change the direction of the vehicle. Steering torque command, $\tau_{cmd}$, may be the steering torque that automated steering control system 90 outputs to EPS system 92, AFS system 94, ARS system 96, or other system to steer and/or change the direction of vehicle. Steering torque command, $\tau_{cmd}$, may, in some embodiments, be the sum of a driver assist torque and an overlay torque. A driver assist torque may be the torque applied by EPS system 92, AFS system 94, ARS system 96, or other system to aid the driver in steering vehicle. Driver assist torque may be zero when a vehicle automated steering system 90 is engaged, and the driver is not steering vehicle 10. An overlay torque may be the torque applied by a vehicle automated steering system 90 in order to actuate the vehicle steering.

Automated steering control may be overridden by operator (e.g. driver) actions if evaluated vehicle steering conditions and an evaluated speed indicate that the operator of the vehicle is overriding the autonomous driving application. One or more vehicle steering measurements may be made and one or more expected vehicle steering measurements may be calculated, each expected vehicle steering measurement corresponding to one of the measured vehicle steering measurements. For example, the steering measurements may include an applied torque or steering angle. The calculated expected vehicle steering measurements may include, for example, an expected torque or an expected steering angle. At least one difference may be calculated between at least one of the expected vehicle steering measurements and its corresponding measured vehicle steering measurement. Each calculated difference may be compared to a corresponding current threshold value that may be calculated on the basis of vehicle speed. One or more of the calculated differences may exceed its corresponding current threshold value. Depending on the particular embodiment, exceeding a current threshold value by one or more of the differences may be interpreted as indicative of an intention by the vehicle operator to override the automated steering control or other autonomous driving application. When such an intention is indicated, control of the vehicle may be transferred fully or partially to the operator.

In some embodiments, an expected steering torque, $\tau_{expected}$, and a steering command torque, $\tau_{cmd}$, may be calculated, as illustrated in block 204. Expected steering torque, $\tau_{expected}$, may be the torque that the system 100 expects to be applied to the vehicle steering system or component(s) of the vehicle steering system when the driver or operator of the vehicle is not attempting to override the automated steering control system. Expected steering torque, may be, in some embodiments, the torque that system 100 expects to be output from vehicle automated steering system 90. Expected steering torque, $\tau_{expected}$, may be calculated based on steering angle measured, $\delta_{meas}$, and vehicle steering parameter, constants and/or pre-determined values using a second-order model, approach, or method; a look-up table; or other method or approach. Steering command torque, $\tau_{cmd}$, may be calculated based on steering angle command, $\delta_{cmd}$, using a second-order model, approach, or method; a look-up table; or other method or approach.

Steering command torque, $\tau_{cmd}$, may be input to an EPS system, AFS system, ARS system, or another system, as illustrated in block 206. Steering command torque, $\tau_{cmd}$, may be the torque that a motor associated with the EPS system, AFS system, ARS system, or other system applies to the steering wheel 82, steering column 84, a component of the automated steering control system 90, or another component of the vehicle steering system.

As illustrated in block 208, steering command torque, $\tau_{cmd}$, may be input into the torque sensor 80 (e.g., a torsion bar, torque transducer, or other device). Torque sensor 80 may measure torque applied to vehicle steering system, $\tau_{cmd}$. Torque applied to vehicle steering system or torque measured, $\tau_{meas}$, may, for example, be applied to the steering wheel 82, steering column 84, vehicle axle or another portion of the vehicle steering system or apparatus. Torque applied to the vehicle steering system, $\tau_{meas}$, may include steering command torque, $\tau_{cmd}$, applied by EPS, AFS, ARS, or another system, and driver inputted torque, $\tau_{driver}$, which may be the amount of torque the driver inputs to steering wheel 82. Steering torque measured, $\tau_{meas}$, may be measured or evaluated by torque sensor 80 (e.g., a torsion bar, torquemeter, torsion sensor, or other device), as depicted in block 208. Steering torque measured, $\tau_{meas}$, may include the amount of torque applied to the steering wheel 82 or related system by the driver, for example, to regain full or partial control of the vehicle steering system.

As depicted in block 210, the difference between steering torque measured, $\tau_{meas}$, and expected steering torque, $\tau_{expected}$, may be calculated if the absolute value or magnitude of the difference is greater than a current torque threshold, $\tau_{thresh}$, an automatic steering control system 90 may be de-activated, disengaged, or overridden by system 100. The current torque threshold, $\tau_{thresh}$, may be calculated based on a measured vehicle speed and on vehicle factors that are determined during or prior to manufacturing of vehicle 10 and may be based on vehicle testing, human factor studies, or other factors. The current torque threshold, $\tau_{thresh}$, may include buffer or additional torque to take into account driver interaction with the steering system that is not intended to override automatic steering control system 90.

According to embodiments of the present invention, an expected steering angle, $\delta_{expected}$, may be calculated by system 100 based on steering angle command, $\delta_{cmd}$, from the vehicle automated steering control system 90, as illustrated in block 212. Expected steering angle, $\delta_{expected}$, may be the steering angle or maximum steering angle that the system expects to be applied to the vehicle steering system or component(s) of the vehicle steering system when the driver or operator of the vehicle is not attempting to override the automated steering control system. The expected steering angle, $\delta_{expected}$, may be calculated based on steering angle command, $\delta_{cmd}$, using a look-up table, simple second order system, second order system, or other mathematical approach or method. The expected steering angle, $\delta_{expected}$, may, in some embodiments, vary from steering angle command, $\delta_{cmd}$, due to vehicle dynamics and steering control variables (e.g., latency, delay and system lag in the steering control system).

Steering angle sensor 70 may measure the steering angle input applied to vehicle steering system, $\delta_{meas}$, as depicted in block 214. Steering angle input may, for example, be applied to the steering wheel 82, steering column 84, vehicle axle or another portion of the vehicle steering system or apparatus. Steering angle measured, $\delta_{meas}$, may include the steering angle input applied to the vehicle steering system by the EPS, AFS, ARS, or other system and the steering angle input applied by the operator of the vehicle (e.g., the driver) to steering wheel 82. Steering angle measured, $\delta_{meas}$, may be measured or evaluated by steering angle sensor(s), as depicted in block 214. Steering angle measured, $\delta_{meas}$, may include the amount of steering angle input applied to the steering wheel 82 or related system by the driver for example, in order to regain full or partial control of the vehicle steering system.

As depicted in block 210, the difference between steering angle measured, $\delta_{meas}$, and expected steering angle, $\delta_{expected}$, is calculated. If the absolute value or magnitude of the difference is greater than a current threshold steering angle, $\delta_{thresh}$, an automatic steering control system 90 may be de-activated, disengaged, or overridden by system 100. The current threshold steering angle, $\delta_{thresh}$, may be determined on the basis of vehicle speed 213 of the vehicle. In addition, for example, the current threshold steering angle, $\delta_{thresh}$, may be calculated on the basis of factors determined during or prior to manufacturing of vehicle 10. These factors may be based on, for example, vehicle testing, human factor studies, or other factors.

For example, vehicle speed 213 may be input from speedometer 74, or may be obtained or derived from another measurement or navigation device such as, for example, UPS, radar, or LIDAR.

The current threshold steering angle, $\delta_{thresh}$, in some embodiments, may include a buffer or additional steering angle to take into account driver interaction with the steering system that is not intended to override automatic steering control system 90. While in one embodiment two factors (steering torque and steering angle) are used, in other embodiments only one factor, or different factors, may be used.

According to some embodiments of the present invention, autonomous steering override detection system 100 may calculate an expected torque, $\tau_{expected}$, (sometimes referred to as $\tau_{EPS}$, the torque output of the EPS motor) using a second-order model approximation or other mathematical approach. In one embodiment, the following formula or differential equation may be solved algebraically, numerically, analytically or using another method to calculate expected torque, $\tau_{expected}$:

$$I_{equ}\ddot{\delta}+c_{equ}\dot{\delta}+k_{equ}\delta_{meas}=\tau_{driver}+\tau_{expected}\tau_{SelfAlign}$$

A second-order model, formula or differential equation, one example of which is represented in the equation above, may be used to calculate the expected torque, $\tau_{expected}$. The expected torque, $\tau_{expected}$, may be calculated, determined, or derived based on the solution of the second-order differential equation. The expected torque, $\tau_{expected}$, may be the only unknown and may be derived based on pre-determined and measured data. The expected torque, $\tau_{expected}$, may be calculated at regular intervals or time steps, for example, every 10 milliseconds or another time period, or may be updated in real-time while the vehicle automated steering control system is engaged.

The terms $I_{equ}$, $c_{equ}$, and $k_{equ}$ may be predetermined constants or parameters. The terms may be determined using un-modeled steering dynamics parameter estimation techniques, during the calibration of the automated vehicle steering control override system 100 in manufacturing, human factor studies, or other methods or approaches. The equivalent steering inertia, $I_{equ}$, may represent a tendency of the steering wheel, automated steering system or other system or device to resist change in rotational acceleration. The equivalent steering damping $c_{equ}$ may represent a tendency of the steering wheel, automated steering system or other system, device, or component to resist change in rotational velocity or speed. The equivalent steering stiffness, $k_{equ}$, may represent resistance of the steering wheel, automated steering system or other system, device or component to displacement. Steering angle velocity, $\dot{\delta}$, may represent a first derivative of steering angle input and may be known and/or constrained by automated steering control override system dynamics, human factor studies, and/or calibration during manufacturing of system 100. Steering angle acceleration, $\ddot{\delta}$, may represent a second derivative of steering angle and may be known and/or constrained by automated steering control override system dynamics, human factor studies, and/or calibration during manufacturing of system 100. The measured steering angle, $\delta_{meas}$, may represent the steering angle measured by steering angle sensor 70 or another device. Driver inputted torque, $\tau_{driver}$, may represent the amount of torque the driver inputs to the steering wheel. In some embodiments, $\tau_{driver}$ may be zero, or another value, if the autonomous steering control system 90 is engaged, and the driver is not interacting with the steering wheel. Self-aligning torque, $\tau_{SelfAlign}$, may represent the torque applied to the vehicle steering system with no driver input or input from a vehicle automated steering system 90. Self-aligning torque, $\tau_{SelfAlign}$, may be a function of vehicle speed, steering angle measurements, tire characteristics, and may also depend on factors that are inherent in the design of the vehicle and/or vehicle steering system and which may be quantified during or prior to manufacturing.

Because the expected torque, $\tau_{expected}$, may be calculated by system 100 based on measured vehicle steering measurements and pre-determined constants and may be calculated at regular time intervals, the expected torque, $\tau_{expected}$, may be adjusted by system 100 based on different driving scenarios and/or conditions. The expected torque, $\tau_{expected}$, may, for example, be higher at low speeds than high speeds. System 100 may, for example, calculate a higher expected torque, $\tau_{expected}$, on curved or banked roads than on flat roads depending on the direction of the curve or bank. Vehicle automated steering override detection system 100 may therefore function accurately and precisely at low speeds, high speeds, on banked roads, on curved roads and in other driving scenarios.

Figure 5:
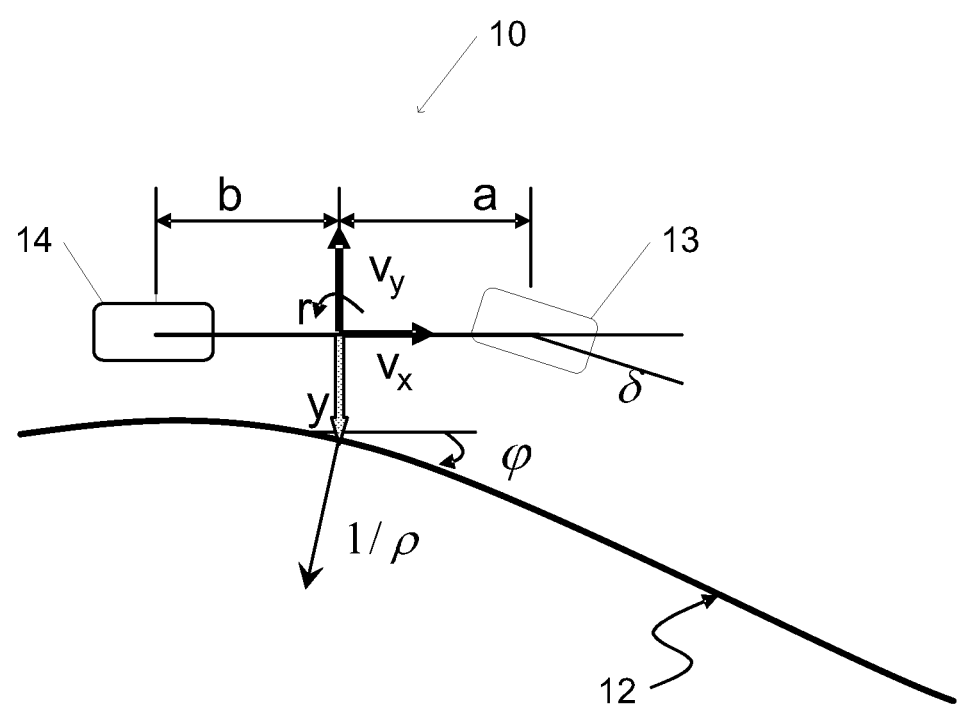
FIG. 5 is a schematic diagram of a lane centering vehicle dynamic model of a vehicle.

FIG. 5 is a schematic diagram of a lane centering vehicle dynamic model of a vehicle. Vehicle 10 (indicated schematically by front wheel 13 at longitudinal distance a from the center of vehicle 10 to the front wheel center and by rear wheel 14 at longitudinal distance b from the center of vehicle 10 to the rear wheel center) is traveling with longitudinal speed $v_x$ and lateral speed $v_y$ along a lane whose lane center 12 has curvature $\rho$. Vehicle 10 is offset front lane center 12 by lateral offset y. Orientation angle $\phi$ describes an angle between lane center 12 and the longitudinal direction x. Vehicle 10 may be characterized by mass m and (moment of) inertia, I, and may be changing its orientation with a yaw rate r (e.g. measurable by a rate gyro, IMU 78, or other device). Steering angle $\delta$ (measurable using steering angle sensor(s) 70 or other sensor may represent an orientation of front tire 13 relative to the longitudinal direction.

Estimated values (e.g. of rates of change $\dot{y}$ of lateral offset y, $\dot{\phi}$ of lane orientation angle $\phi$ with respect to the vehicle-centered, coordinates, $\dot{v}_y$ of lateral speed $v_y$, and $\dot{r}$ of yaw rate r) such that vehicle 10 continues to maintain lateral offset y with respect to lane center 12 may be calculated from a set of equations expressible as (where corner stiffness of the front wheels is represented by $C_f$ and the corner stiffness of the rear wheels is represented by $C_r$):

$$\begin{bmatrix} \dot{y} \\ \dot{\varphi} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & \frac{a^2 C_f + b^2 C_r}{Iv_x} \end{bmatrix} .$$

$$\begin{bmatrix} y \\ \varphi \\ v_y \\ r \end{bmatrix} + \begin{bmatrix} 0 \\ 0 \\ \frac{C_f}{m} \\ \frac{aC_f}{I} \end{bmatrix} \cdot \delta + \begin{bmatrix} 0 \\ v_x \\ 0 \\ 0 \end{bmatrix} \cdot \rho$$

As discussed above, a current torque threshold, $\tau_{thresh}$, or current threshold steering angle, $\delta_{thresh}$, may be dependent on vehicle speed (e.g., vehicle longitudinal speed, $v_x$ or other vehicle speed).

In accordance with an embodiment of the invention, a current threshold value, e.g. of torque or steering angle, may have a constant value if the vehicle speed falls outside of e.g. is greater than or less than, a predetermined range of vehicle speeds. The predetermined range may be defined by upper and lower speed limits, thresholds, or boundaries.

Figure 6A:
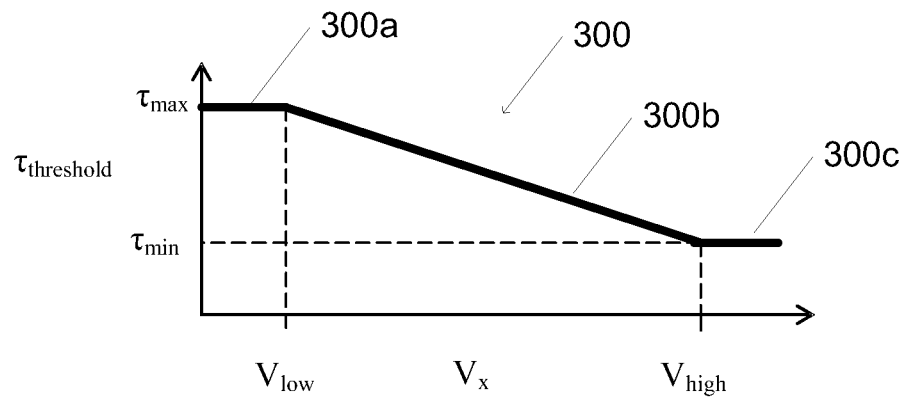
FIG. 6A is a graph of a dependence of torque threshold on vehicle speed according to an embodiment of the present invention.

FIG. 6A is a graph of a dependence of torque threshold on vehicle speed according to an embodiment of the present invention. Graph 300 illustrates a typical dependence of torque threshold $\tau_{thresh}$ on vehicle speed $v_x$ vehicle longitudinal speed). When vehicle speed $v_x$ is less than or equal to lower speed range boundary $v_{low}$ (segment 300a), torque threshold $\tau_{thresh}$ may be equal to a constant maximum torque threshold $\tau_{max}$. For example, lower speed range limit, threshold, or boundary $v_{low}$ may be equal to 5 miles per hour (mph) and maximum torque threshold $\tau_{max}$ may be equal to 2 Newton-meters (Nm). Similarly, when vehicle speed $v_x$ is greater than or equal to upper speed range limit, threshold, or boundary $v_{high}$ (segment 300c), torque threshold $\tau_{thresh}$ may be equal to a constant minimum torque threshold $\tau_{min}$. For example, upper speed range boundary $v_{high}$ may be 75 mph and minimum torque threshold $\tau_{min}$ may be equal to 1.2 Nm. Maximum torque threshold $\tau_{max}$ and minimum torque threshold $\tau_{min}$ may be determined or adjusted based on such factors as the type of vehicle, previous testing, tuning of the vehicle, or similar vehicle-dependent factors. Other thresholds and ranges may be used, When vehicle speed $v_x$ is greater than lower speed range boundary $v_{low}$ and less than upper speed range boundary $v_{high}$, torque threshold $\tau_{thresh}$ may vary as a function of vehicle speed $v_x$. For example, torque threshold $\tau_{thresh}$ may linearly decline with increasing vehicle speed $v_x$ from maximum torque threshold $\tau_{max}$ to minimum torque threshold $\tau_{min}$ (segment 300b). Such a linear dependence may be expressed as:

$$\tau_{thresh} = \frac{\tau_{min} - \tau_{max}}{v_{high} - v_{low}} (v_x - v_{low}) + \tau_{max}$$

As another example, torque threshold $\tau_{thresh}$ may decline from maximum torque threshold $\tau_{max}$ to minimum torque threshold $\tau_{min}$ as a polynomial (e.g. quadratic or cubic), logarithmic, sinusoidal, exponential or other declining function of vehicle speed $v_x$ in the range between lower speed range boundary $v_{low}$ and upper speed range boundary $v_{high}$.

Figure 6B:
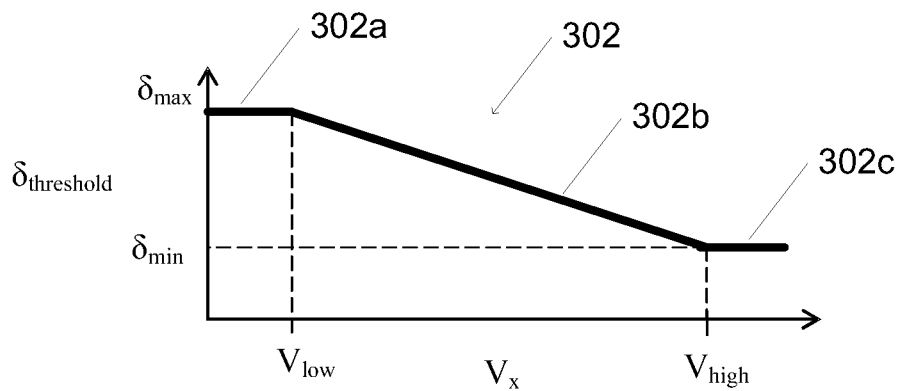
FIG. 6B is a graph of a dependence of threshold steering angle on vehicle speed according to an embodiment of the present invention.

FIG. 6B is a graph of a dependence of threshold steering angle on vehicle speed according to an embodiment of the present invention. Graph 302 illustrates a typical dependence of steering angle threshold $\delta_{thresh}$ on vehicle speed $v_x$. When vehicle speed $v_x$ is less than or equal to lower speed range limit, threshold, or boundary $v_{low}$ (segment 302a), steering angle threshold $\delta_{thresh}$ may be equal to a constant maximum steering angle threshold $\delta_{max}$. For example, lower speed range boundary $v_{low}$ may be 5 mph and maximum steering angle threshold $\delta_{max}$ may be equal to 2 degrees. Similarly, when vehicle speed $v_x$ is greater than or equal to upper speed range limit, threshold, or boundary $v_{high}$ (segment 302c), steering angle $_{thresh}$ may be equal to a constant minimum steering angle threshold $\delta_{min}$. For example, upper speed range boundary $v_{high}$ may be 75 mph and minimum steering angle threshold $\delta_{min}$ may be equal to 1.2 degrees. Maximum steering angle threshold $\delta_{max}$ and minimum steering angle threshold $\delta_{min}$ may be determined or adjusted based on such factors as the type of vehicle, previous testing, tuning of the vehicle, or similar vehicle-dependent factors. Other ranges may be used. In other embodiments, setting the threshold to a constant when in certain ranges need not be used, or lower and upper boundaries of the speed range may encompass all speeds which the vehicle is capable of attaining.

When vehicle speed $v_x$ is greater than lower speed range boundary $v_{low}$ and less than upper speed range boundary $v_{high}$, steering angle threshold $\delta_{thresh}$ may vary as a function of vehicle speed $v_x$. For example, steering angle threshold $\delta_{thresh}$ may linearly decline with increasing vehicle speed $v_x$ from maximum steering angle threshold $\delta_{max}$ to minimum steering angle threshold $\delta_{min}$ (segment 302b). Such a linear dependence may be expressed as:

$$\delta_{thresh} = \frac{\delta_{min} - \delta_{max}}{v_{high} - v_{low}}(v_x - v_{low}) + \delta_{max}.$$

As another example, steering angle threshold $\delta_{thresh}$ may decline from maximum steering angle threshold $\delta_{max}$ to minimum steering angle threshold $\delta_{min}$ as a polynomial (e.g. quadratic or cubic), logarithmic, sinusoidal, exponential, or other declining function of vehicle speed $v_x$ in the range between lower speed range boundary $v_{low}$ and upper speed range boundary $v_{high}$.

Figure 7:
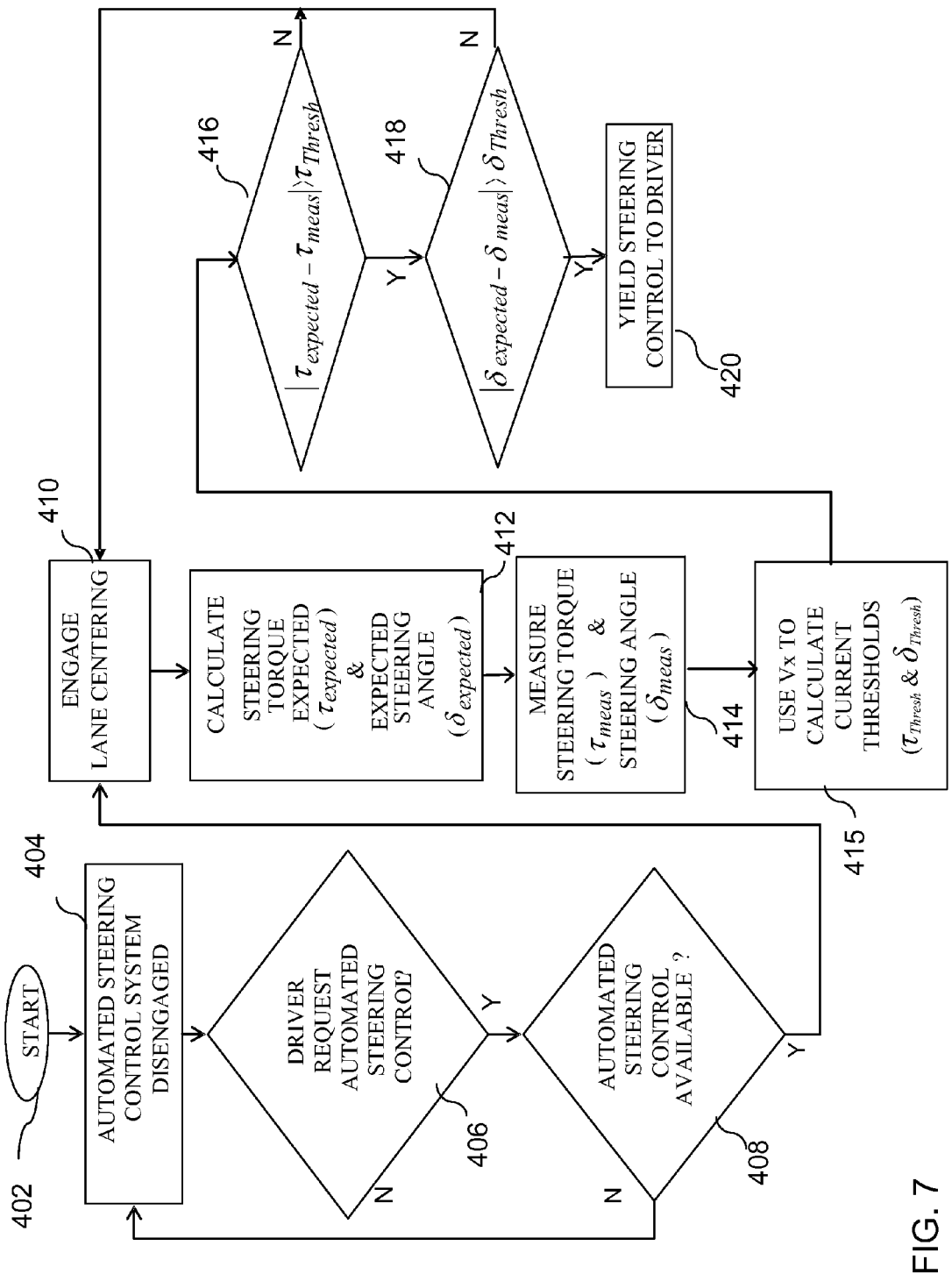
FIG. 7 is a flowchart of a method according to an embodiment of the present invention.

FIG. 7 is a flowchart of a method according to an embodiment of the invention. The operations may be carried out by vehicle location system 100 or by other systems associated with or separate from vehicle 10.

It should be understood with respect to this flowchart and all flowcharts referenced herein that, unless stated to the contrary, the order of blocks is selected for the purposes of convenience and clarity only. Operations represented by blocks of the flowchart may be performed in a different order or concurrently with equivalent results. All such alternative ordering of the operations should be understood as included within embodiments of the invention.

As depicted in blocks 402 and 404, the system or process may be initiated when the vehicle automated steering control system 90 is not engaged or activated. As illustrated by block 406, an action e.g., a push of a button, activation of a switch, etc.) may be performed by a driver to engage an automated steering control system 90. As illustrated in block 408, it may be determined by system 90 whether the automated steering control system is available and may be activated. As depicted in block 410, if automated steering control system 90 is available, the system may be engaged. When engaged, the automated steering control system 90 may then automatically control the direction and/or heading of vehicle travel. As depicted in block 412, at any time while the automated steering control system 90 is engaged, steering torque expected, $\tau_{expected}$, and steering angle expected, $\delta_{expected}$, may be calculated, determined, or formulated by system 100. Steering torque expected, $\tau_{expect}$, and steering angle expected, $\delta_{expected}$, may be calculated using a second order model, a simple second order model the solution to a differential equation, a look-up table, a linear transformation or other mathematical model or approach. Steering torque expected, $\tau_{expected}$, and steering angle expected, $\delta_{expected}$, may be calculated at regular intervals (e.g., every 10 milliseconds or another time period) or may be calculated continuously by system 100 while automated steering control system 90 is engaged. As illustrated in block 414, vehicle may evaluate a plurality of vehicle steering conditions using a plurality of sensors associated with vehicle 10. For example, steering torque, $\tau_{meas}$, and steering angle, $\delta_{meas}$, may be evaluated or measured by system 100 using one or more sensor(s) associated with vehicle 10. Steering torque measured, $\tau_{meas}$, and steering angle measured, $\delta_{meas}$, may be measured or evaluated at regular intervals (e.g., every 10 milliseconds or another time period) or may be measured continuously by system 100 while automated steering control system 90 is engaged.

As illustrated in block 415, a current torque threshold $\tau_{thresh}$ and a current steering angle threshold $\tau_{thresh}$ may be calculated on the basis of a measured value of vehicle speed $v_x$. For example, vehicle speed $v_x$ may be obtained or received by system 100 from speedometer 74 (or obtained or derived from another measurement or navigation device such as, for example, GPS, radar, or LIDAR).

Calculation of current torque threshold $\tau_{thresh}$ may be based, for example, on a lookup table. For example, a lookup table may be stored in memory 120 or in disk 130. Alternatively, calculation of current torque threshold $\tau_{thresh}$ may be based on a numerical calculation based on a predetermined functional relationship between current torque threshold $\tau_{thresh}$ and vehicle speed $v_x$. For example, a numerical calculation may be performed by processor 110 based on parameters or coefficients stored in memory 120 or in disk 130.

Similarly, calculation of current steering angle threshold $\delta_{thresh}$ may be based on a lookup table. For example, a lookup table may be stored in memory 120 or in disk 130. Alternatively, calculation of current steering angle threshold $\delta_{thresh}$ may be based on a numerical calculation based on a predetermined functional relationship between steering angle threshold $\delta_{thresh}$ and vehicle speed $v_x$. For example, a numerical calculation may be performed by processor 110 based on parameters or coefficients stored in memory 120 or in disk 130.

As illustrated, in block 416, the difference between steering torque expected, $\tau_{expected}$, and steering torque measured, $\tau_{meas}$, may be calculated by system 100. The difference between steering torque expected, $\tau_{expected}$, and steering torque measured, $\tau_{meas}$, may be compared to a current torque threshold, $\tau_{thresh}$, by system 100. In one embodiment, the absolute value of the difference between steering torque expected, $\tau_{expected}$, and steering torque measured, $\tau_{meas}$, may be compared to a current torque threshold, $\tau_{thresh}$, by system 100. The current torque threshold may, for example, vary between 1.2 Nm and 2 Nm, depending of vehicle speed $v_x$. Other ranges may be used. If the difference between steering torque expected, $\tau_{expected}$, and steering torque measured, $\tau_{meas}$, or the absolute value of the difference, is greater than current torque threshold, $\tau_{thresh}$, vehicle automated steering control system 90 may be disengaged (e.g., by system 100)

and steering control may be fully or partially relinquished to the driver, as depicted by block 420.

As illustrated in block 418, the difference between steering angle expected, $\delta_{expected}$, and steering angle measured, $\delta_{meas}$, may be calculated by system 100. The difference between steering angle expected, $\delta_{expected}$, and steering angle measured, $\delta_{meas}$, may be compared to a current threshold angle, $\delta_{thresh}$, by system 100. In one embodiment, the absolute value of the difference between steering angle expected, $\delta_{expected}$, and steering angle measured, $\delta_{meas}$, may be compared to a current steering angle threshold, $\delta_{thresh}$, by system 100. If the difference between steering angle expected, $\delta_{expected}$, and steering angle measured, $\delta_{meas}$, or absolute value of the difference, is greater than current steering angle threshold $\delta_{thresh}$, vehicle automated steering control system 90 may be disengaged (e.g., by system 100) and steering control may be fully or partially relinquished to the driver, as depicted by block 420.

According to some embodiments of the present invention, both the difference between steering torque expected, $\tau_{expected}$, and steering torque measured, $\tau_{meas}$, and the difference between steering angle expected, $\delta_{expected}$, and steering angle measured, $\delta_{meas}$, may be calculated by system 100. If the difference, absolute value of the difference, or magnitude of the difference between steering torque expected, $\tau_{expected}$, and steering torque measured, $\tau_{meas}$, is greater than current torque threshold, $\tau_{thresh}$, and the difference, absolute value of the difference, or magnitude of the difference between steering angle expected, $\delta_{expected}$, and steering angle measured, $\delta_{meas}$, is greater than current steering angle threshold $\delta_{thresh}$, vehicle automated steering control system 90 may be disengaged and steering control may be fully or partially relinquished to the driver, as depicted by block 420. Thus, if the evaluated vehicle dynamic conditions indicate the operator of the vehicle (e.g., the driver) is overriding the autonomous driving application, the autonomous driving application (e.g., adaptive lane centering system) may be deactivated.

In accordance with some embodiments of the invention, steering control may be fully or partially relinquished to the driver as depicted by block 420, only if the conditions represented by block 416 and block 418 are both met. In accordance with other embodiments of the invention, steering control may be fully or partially relinquished to the driver, as depicted by block 420, if one of the conditions represented by either of block 416 or block 418 is met. In accordance with other embodiments of the invention, steering control may be fully or partially relinquished to the driver, as depicted by block 420, if the condition represented by one or the other of block 416 or block 418 is met, irrespective of the other condition (for example, the condition indicated by either block 416 or by block 418 may be ignored or omitted).

In accordance with an embodiment of the invention, a condition may include comparing a difference between a measured and expected value of a quantity that is relatable to, or derivable from, a torque or steering angle, or another steering or steering control related parameter, to a speed-dependent threshold value. Parameters other than torque and angle may be used.

An alert, indication, alarm or signal may be provided to the driver by system 100 prior to or after disengaging and/or de-activating the automated steering control system 90. The alert may be, for example, an audible alert, light, signal, notification or other form of alert.

Other or different series of operations may be used.

Figure 8:
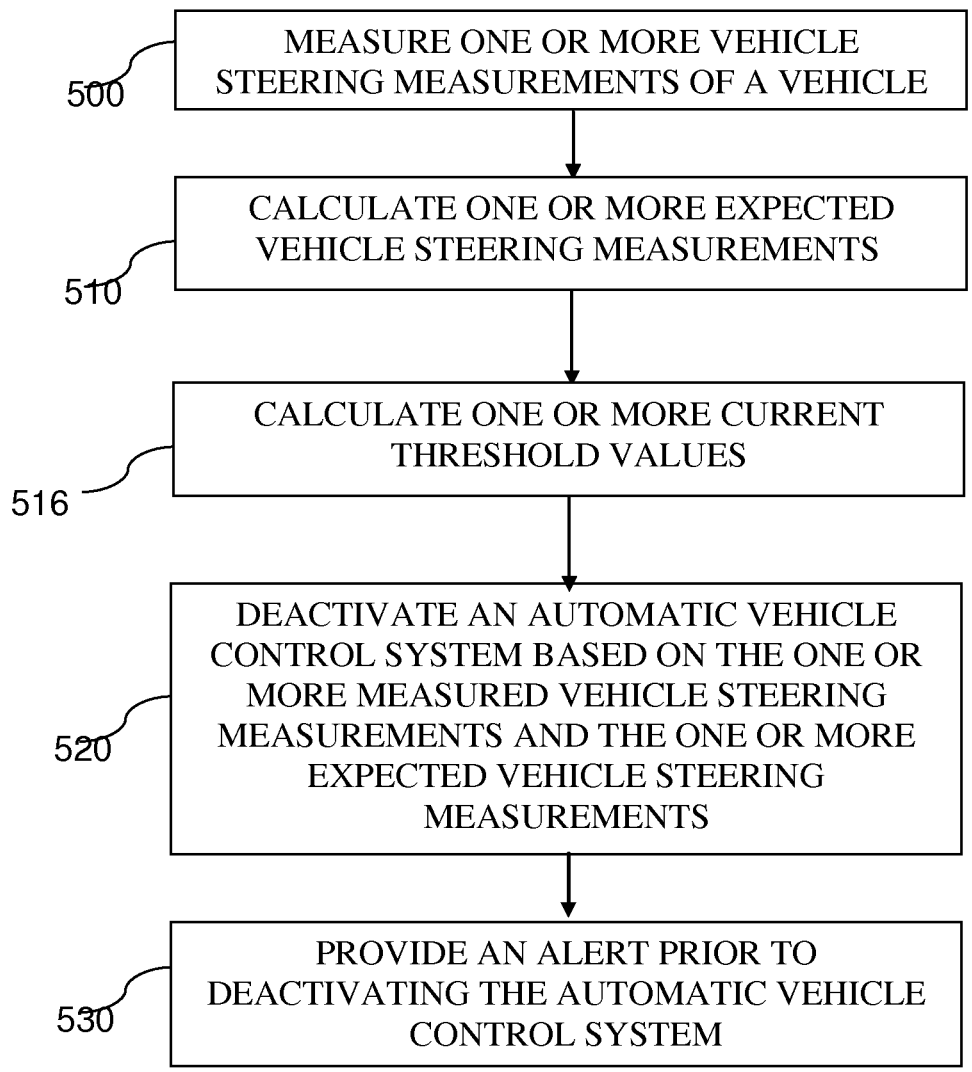
FIG. 8 is a flowchart of a method according to an embodiment of the present invention.

FIG. 8 is a flowchart of a method according to an embodiment of the present invention.

In operation 500, one or more vehicle steering measurements of a vehicle may be measured. The one or more vehicle steering measurements may, for example, be measured by steering angle sensor (e.g., steering angle sensor 70 in FIG. 1), steering torque sensor (e.g., a torsion bar, torsion sensor, or steering torque sensor 80 in FIG. 1), or other device.

In operation 510, one or more expected vehicle steering measurements may be calculated based on the one or more measured vehicle steering measurements. The one or more expected vehicle steering measurements may, for example, be calculated using a second order system mathematical approach, look-up table, or other method or approach.

In operation 516, one or more current threshold values (e.g. a current torque threshold value or a current steering angle threshold value) may be adjusted, set, or calculated based on a measured or derived vehicle speed (e.g. measured by a speedometer 74 in FIG. 1, or obtained or derived from another measurement or navigation device such as, for example, GPS, radar, or LIDAR). For example, a GPS measurement (or series of GPS measurements) may indicate a speed of the vehicle. A radar or LIDAR measurement (or series of measurements) of a stationary object may indicate a speed of the vehicle with respect to the stationary object. Each of the current threshold values may correspond to one of the measured vehicle steering measurements and a corresponding calculated expected vehicle steering measurement.

In operation 520, an automatic vehicle control system (e.g., system 90 in FIG. 1) may, based on the one or more measured vehicle steering measurements and the one or more expected vehicle steering measurements, be deactivated. For example, a difference between one of the measured vehicle steering measurements and a corresponding calculated expected vehicle steering measurement may be measured, and this may be compared to a corresponding threshold. For example, system 100 may send a signal or command to system 90 to deactivate. The one or more vehicle steering measurements may include a vehicle steering angle measurement, vehicle steering torque measurement, steering angle condition, steering torque condition, vehicle yaw-rate, vehicle lateral acceleration, vehicle longitudinal acceleration, or other vehicle dynamics measurements.

In operation 530, system 100 may provide an alert prior to deactivating or disengaging the automatic vehicle control system 90. The alert may be issued, for example, to a driver or to a vehicle automatic steering control system 90. The alert may inform the driver that the automatic steering control system 90 may be disengaged.

Other or different series of operations may be used.

Embodiments of the present invention may include apparatuses for performing the operations described herein. Such apparatuses may be specially constructed for the desired purposes, or may include computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed, it should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for enabling manual override of an automatic steering system of a vehicle by a controller of the system, the method comprising:
    automatically acquiring by the controller a measurement of a steering angle input to the vehicle so as to obtain a measured steering angle;
    automatically acquiring by the controller a measurement of a steering torque of the vehicle;
    calculating an expected steering angle of the vehicle that the automatic control system is expected to apply, wherein calculating the expected steering angle comprises using at least one of a second-order system, a look-up table or a mathematical method;
    solving a set of equations that relate to a lateral offset of the vehicle from a center of a lane, an orientation angle of the vehicle with respect to a center line of the lane, a lateral speed of the vehicle, a yaw rate of the vehicle, the measured steering angle and to a curvature of a lane center along which the vehicle is to travel to calculate the expected steering angle;
    calculating an expected steering torque that the automatic control system is expected to apply using the calculated expected steering angle, wherein calculating the expected steering torque comprises using at least one of a second-order model, a look-up table or a mathematical method;
    calculating a mathematical absolute value of a steering angle difference between the measured steering angle and the calculated expected steering angle;
    calculating a mathematical absolute value of a torque difference between the measured steering torque and the calculated expected steering torque;
    automatically acquiring by the controller a measurement of a speed of the vehicle;
    calculating a current steering angle threshold based on at least two or more of the measured speed, entries in a lookup table and a predetermined functional relationship between current steering angle threshold and vehicle speed, wherein calculating the current torque threshold comprises using a mathematical dependence on vehicle speed, and the mathematical dependence is at least one of a linear, polynomial, logarithmic, sinusoidal or exponential dependence;
    calculating a current torque threshold based on at least two or more of the measured speed, entries in a lookup table and a predetermined functional relationship between current torque threshold and vehicle speed, wherein calculating the current torque threshold comprises using a mathematical dependence on vehicle speed, and the mathematical dependence is at least one of a linear, polynomial, logarithmic, sinusoidal or exponential dependence; and
    automatically deactivating the automatic vehicle steering system when both the calculated steering angle difference exceeds the calculated current steering angle threshold and the calculated torque difference exceeds the calculated current torque threshold.

2. The method of claim 1, wherein the calculated current steering angle threshold declines in value as the measured vehicle speed increases.

3. The method of claim 1, wherein the current steering angle threshold has a constant value when the measured speed is outside a predetermined bounded range of speeds.

4. The method of claim 1, wherein the automatic vehicle control system comprises an automated lane centering system.

5. The method of claim 1, comprising providing an alert prior to deactivating the automatic vehicle control system, said alert based on at least a steering angle difference.

6. The method of claim 1, wherein the current torque threshold has a constant value when the measured speed is greater than or less than a predetermined range of speeds.

7. A system comprising:
    a vehicle automated steering system;
    one or more sensors; and
    a controller to:
        measure a steering torque of a vehicle;
        measure a steering angle input to the vehicle and so as to obtain a measured steering angle;
        calculate an expected steering angle that the vehicle automated steering system is expected to apply, wherein calculating the expected steering angle comprises using at least one of a second-order system, a look-up table or a mathematical method;
        solve a set of equations that relate to a lateral offset of the vehicle from a center of a lane, an orientation angle of the vehicle with respect to a center line of the lane, a lateral speed of the vehicle, a yaw rate of the vehicle, the measured steering angle and to a curvature of a lane center along which the vehicle is to travel of the vehicle;
        calculate an expected steering torque that the vehicle automated steering system is expected to apply using the calculated expected steering angle, wherein calculating the expected steering torque comprises using at least one of a second-order model, a look-up table or a mathematical method;
        calculate a mathematical absolute value of a steering angle difference between the measured steering angle and the calculated expected steering angle;
        calculate a mathematical absolute value of a torque difference between the measured steering torque and the calculated expected steering torque;
        measure a speed of the vehicle;
        calculate a current steering angle threshold based on at least two or more of the measured speed, entries in a lookup table and a predetermined functional relationship between current steering angle threshold and vehicle speed, wherein calculating the current torque threshold comprises using a mathematical dependence on vehicle speed, and the mathematical dependence is at least one of a linear, polynomial, logarithmic, sinusoidal or exponential dependence, and a current torque threshold based on at least two or more of the measured speed, entries in a lookup table and a predetermined functional relationship between current torque threshold and vehicle speed, wherein calculating the current torque threshold comprises using a mathematical dependence on vehicle speed, and the mathematical dependence is at least one of a linear, polynomial, logarithmic, sinusoidal or exponential dependence; and deactivate the vehicle automated steering system when both the calculated steering angle difference exceeds the calculated current steering angle threshold and the calculated torque difference exceeds the calculated current torque threshold.

8. The system of claim 7, wherein the calculated current steering angle threshold declines in value as the measured vehicle speed increases.

9. The system of claim 7, wherein the current steering angle threshold has a constant value when the measured speed is outside a predetermined bounded range of speeds.

10. The system of claim 7, wherein the vehicle automated steering system comprises an adaptive lane centering system.

11. The system of claim 7, wherein the controller is configured to provide an alert prior to deactivating the vehicle automated steering system, said alert based on at least a steering angle difference.

12. The system of claim 7, wherein the current torque threshold has a constant value when the measured speed is greater than or less than a predetermined range of speeds.

* * * * *